United States Patent [19]

Logan et al.

[11] Patent Number: 5,139,373
[45] Date of Patent: Aug. 18, 1992

[54] OPTICAL LENS PATTERN MAKING SYSTEM AND METHOD

[75] Inventors: David J. Logan, Glastonbury; William Hernandez, Madison, both of Conn.

[73] Assignee: Gerber Optical, Inc., South Windsor, Conn.

[21] Appl. No.: 652,464

[22] Filed: Feb. 7, 1991

Related U.S. Application Data

[63] Continuation of Ser. No. 896,616, Aug. 14, 1986, abandoned.

[51] Int. Cl.$^5$ ............................................. B24B 7/00
[52] U.S. Cl. .................... 409/80; 51/101 LG; 51/284 R; 409/84; 409/132
[58] Field of Search ............... 51/101 LG, 289 R; 409/84, 85, 94, 113, 117, 131, 132, 80

[56] References Cited

U.S. PATENT DOCUMENTS

| 3,170,374 | 2/1965 | Clar | 409/84 |
|---|---|---|---|
| 3,786,600 | 1/1974 | Bloxsom | 51/284 E |
| 4,517,870 | 5/1985 | Kopp | 51/101 LG X |
| 4,656,590 | 4/1987 | Ace | 51/101 LG X |
| 4,711,035 | 12/1987 | Logan et al. | 33/200 |
| 4,724,617 | 2/1988 | Logan et al. | 33/28 |
| 4,761,315 | 8/1988 | Logan et al. | 33/200 X |
| 4,912,880 | 4/1990 | Haddock et al. | 51/101 LG |

FOREIGN PATENT DOCUMENTS

| 0160985 | 11/1985 | European Pat. Off. | 51/101 LG |
|---|---|---|---|
| 2938660 | 4/1981 | Fed. Rep. of Germany | 409/84 |

Primary Examiner—Z. R. Bilinsky
Attorney, Agent, or Firm—McCormick, Paulding & Huber

[57] ABSTRACT

A system and related method or process for producing a pattern for a lens to be formed and then placed in an opening in an eyeglass frame utilizes a frame tracing apparatus for providing coordinate data characterizing the size and shape of the lens opening in associated one specific eyeglass frame for transmission to a pattern generator having a cutter which moves relative to a blank fixtured at a work station in the generator to cut a pattern having the desired size and shape. A number of frame tracing apparatus are arranged to transmit data to a pattern generator via a central data base computer coupled to the frame tracing apparatus by a communications link whereby the pattern generator subsequently receives the dimensional data corresponding to the specific lens opening traced by the frame tracing apparatus to generate the desired pattern from blanks continuously and automatically fed to the pattern generator.

12 Claims, 5 Drawing Sheets

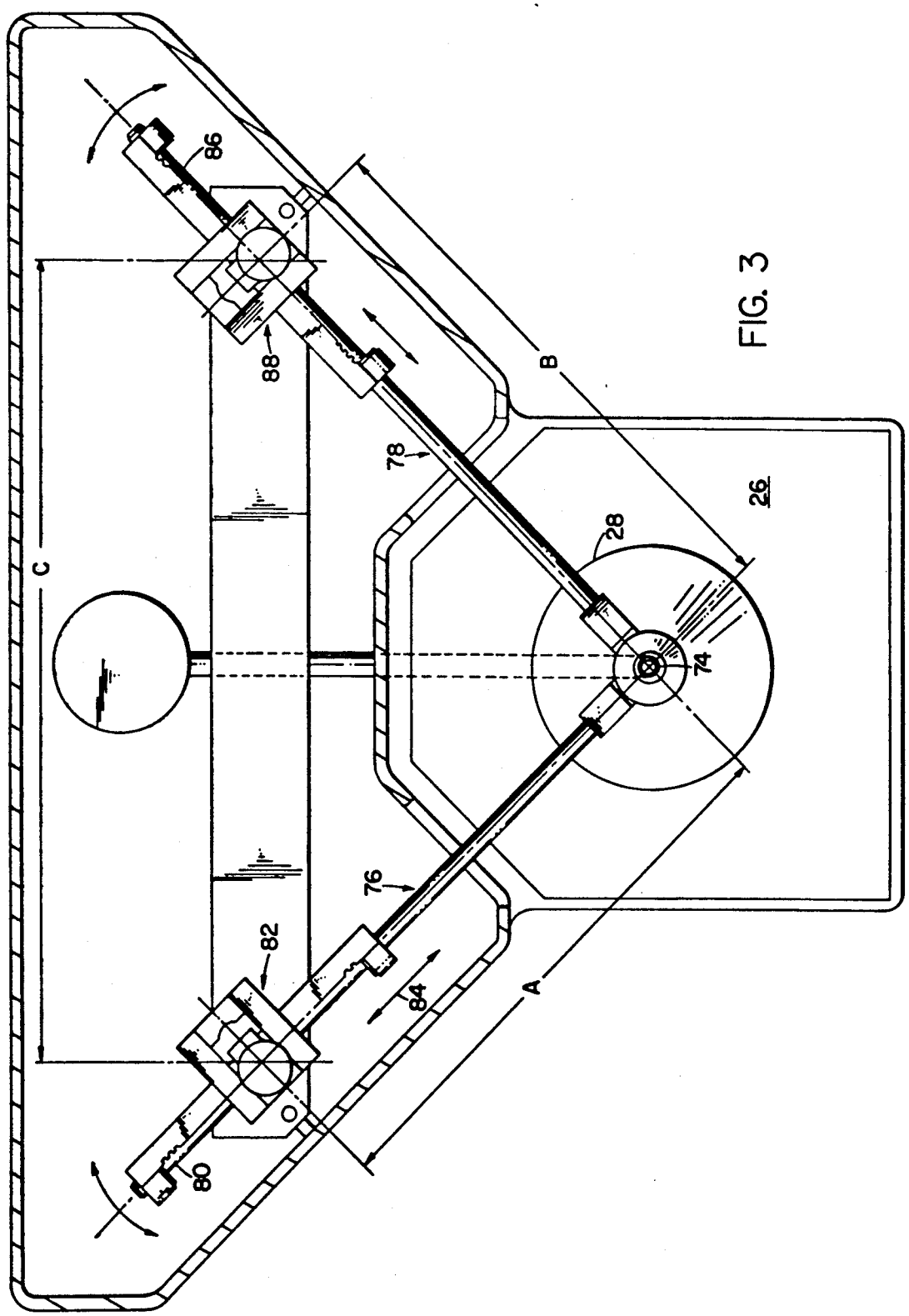

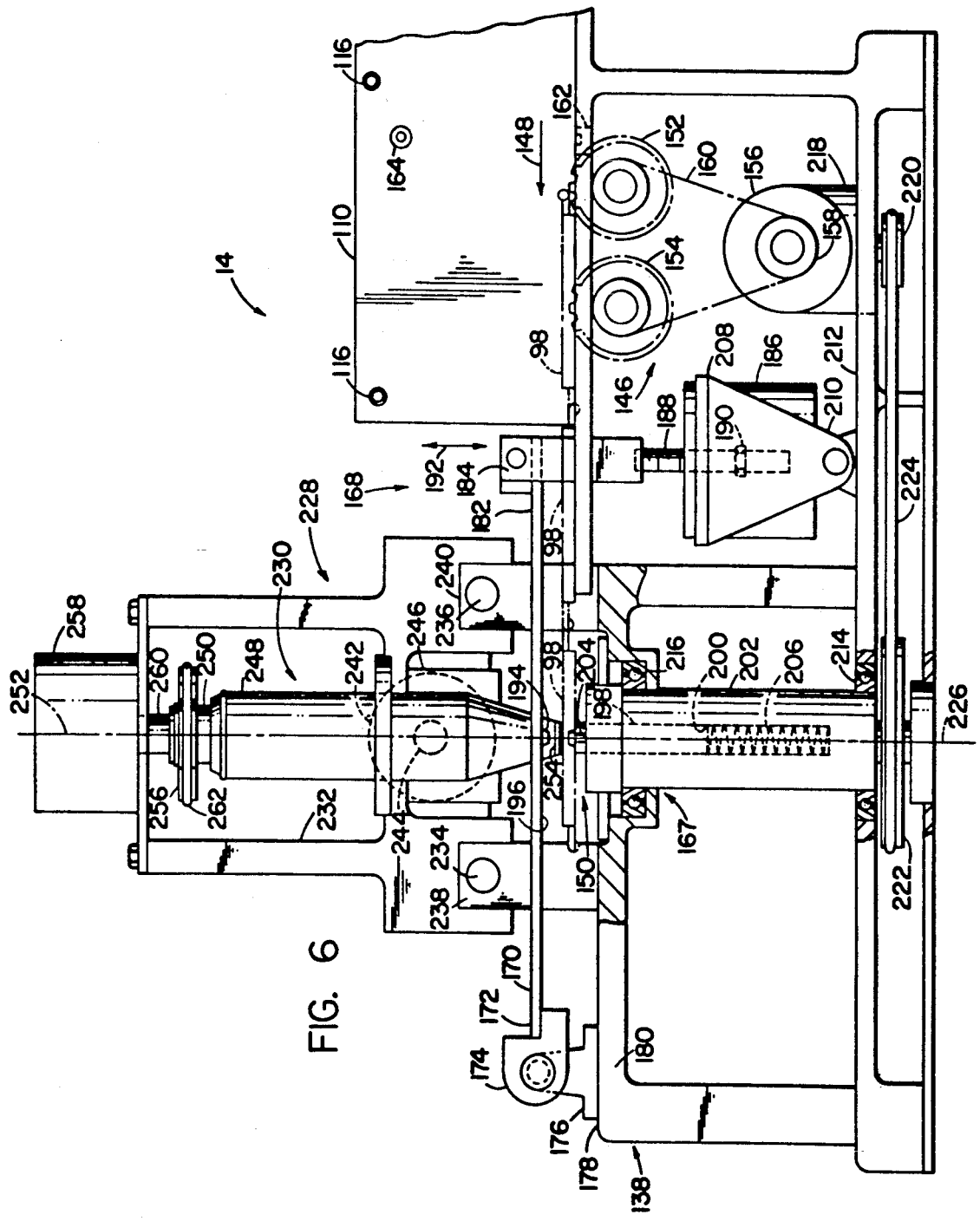

OPTICAL LENS PATTERN MAKING SYSTEM AND METHOD

This is a continuation of co-pending application Ser. No. 896,616 filed on Aug. 14, 1986 abandoned.

BACKGROUND OF THE INVENTION

The present invention relates generally to optical lens patterns and deals more specifically with a system and method or process especially suited for producing a unique pattern for a lens to be formed and then placed in an opening in a specific eyeglass frame wherein data characterizing the size and shape of the associated lens opening is provided to a pattern generator by a frame tracing apparatus coupled to the pattern generator.

Heretofore, the fitting of an optical lens in an associated eyeglass frame lens opening has generally relied upon the manufacturer of the particular style eyeglass frame to provide a nominally sized pattern for the opening. Such a pattern substantially replicates the shape of the lens opening in a representative eyeglass frame style and which pattern is typically used as a guide to control edging apparatus which peripherally contours or edges an optical lens blank to the shape of the lens opening. The patterns supplied by a manufacturer are usually identified and often kept in an inventory maintained by the user of such patterns.

Over the past several years, the proliferation of eyeglass frame styles and an increased number of eyeglass frame manufacturers have made it impractical for those operating from an inventory of patterns to order and maintain a pattern for each of the different eyeglass frame styles due in part to the increased space requirements necessary to store the greater number of different patterns. In addition, the process of selecting a given pattern from the inventory has become more difficult, inconvenient and time consuming especially in a large laboratory where a given pattern may be in use and not available for selection.

In smaller laboratories, it may be uneconomical or unreasonable to keep an inventory of patterns. In many of these cases a pattern is made either directly or indirectly from a frame or from a tracing of the frame lens opening. One such method for making a pattern utilizes a pattern blank that has a grid-like scale comprised of measured distances left, right, up and down from an origin printed on the blank. The origin of the grid coincides with the mechanical center of a blank and accordingly the mechanical center of a pattern made from the blank. In using such a blank, the mechanical center of the lens opening and the mechanical center of the blank must be properly aligned because a very small error of even a few tenths of a millimeter can result in an improper fitting lens. In addition, the horizontal axis of the lens opening in the eyeglass frame and the horizontal axis of the pattern must be maintained in a parallel relationship to ensure that the lens optics of a lens made from a corresponding pattern is positioned properly before the eye when the lens is in the eyeglass frame lens opening.

Once the frame lens opening is properly aligned horizontally and centered, the lens opening shape is transferred to the grid on the blank by tracing the lens opening with a tracing pen or other suitable marking device and the pattern blank is cut along the marked outline to produce the pattern. Any roughness in the pattern edge is usually smoothed with a file or wheel grinder.

A pattern made using the above described method cannot be assured to have the same size and shape as the frame lens opening unless compensation is made for the thickness of the tracing pen line and the depth of the eyewire groove among others Additionally there may be variations from eyeglass frame-to-eyeglass frame of the same style such as distortion caused by handling or heating of the frame, in which case a pattern produced for one frame lens open may not be suitable for another frame lens opening of the same eyeglass frame style.

The foregoing method for tracing a frame lens opening and producing an associated pattern requires a high degree of skill, is time consuming, often taking up to five minutes to trace and produce a pattern, and subjects an optical lens made from an incorrectly centered or dimensioned pattern to improper fitting in the lens opening and optical error. Furthermore, the above method is unsuitable for the economic production of large quantities of the same or different patterns.

It is a general object of the present invention therefore to provide a system for generating a pattern from a blank wherein the generated pattern replicates the size and shape of a lens opening in a specific eyeglass frame and with a further object that the data characterizing the size and shape of the lens opening be transmitted directly to a pattern generator from a frame tracing apparatus.

Another object of the invention is to provide such a system comprised of individual system components which are interconnectable for use in close proximity to one another at one location or as a network between a frame tracing apparatus and a pattern generator located remotely from one another at different locations.

Yet another object of the invention is to provide such a system for producing a large quantity of differently shaped patterns in a relatively short time period.

These general objects are achieved in accordance with the invention, and as described in more detail hereinafter, by a lens pattern making system having an eyeglass frame tracing apparatus for characterizing the size and shape of a lens opening in a specific eyeglass frame and means for transmitting the data to a pattern generator which may be located in proximity to or remotely from the tracing apparatus and which generator cuts a corresponding pattern from a blank fed to the generator.

Other objects and advantages of the present invention will be apparent from the following description of a preferred embodiment and the drawings.

SUMMARY OF THE INVENTION

The present invention resides in a system and related method for producing a unique pattern for a lens to be formed and then placed in an opening in a specific eyeglass frame wherein data characterizing the size and shape of the associated lens opening is provided to a pattern generator by a frame tracing apparatus coupled to the pattern generator wherein the generator cuts a corresponding pattern from a blank fed to the generator.

The frame tracing apparatus includes a stylus assembly for following the eyewire groove along the inner periphery of a lens opening and a number of data points along the stylus travel path are sensed and encoded. A controller in the tracing apparatus calculates coordinates for each of the sensed data points and uses the boxing measurement system to provide dimensional data in the form of A and B axis lengths, the effective diameter and the length of each radius and its associated angle at predetermined spaced apart positions along the periphery of the lens opening. The dimensional data is transmitted to a pattern generator directly or via a central data base computer coupled to the frame tracing apparatus.

The pattern generator has a cutter that moves in a rectilinear path and relative to the rotational movement of a blank fixtured at a work station in accordance with control signals generated by a controller. The controller includes an instruction set which receives the dimensional data and calculates the relative movement between the cutter and the rotation of the blank to produce a pattern having the desired size and shape.

The system also includes blanks in a chain of blanks for continuous feeding to the pattern generator wherein each blank is arranged for interconnection and folding in a like face-to-like face fashion to form a compactly folded package. Each blank further includes indicia to identify the nasal side of a pattern cut from the blank.

BRIEF DESCRIPTION OF THE DRAWINGS

FIG. 3 is a schematic top view of the tracing apparatus used with the system of FIG. 1 with the cover removed and showing the arrangement of the encoder arms and their respective attachment to the stylus assembly.

FIG. 6 is a schematic front view of the pattern generating apparatus used with the system of FIG. 1 with the cover removed.

DETAILED DESCRIPTION OF THE PREFERRED EMBODIMENTS

Figure 1:
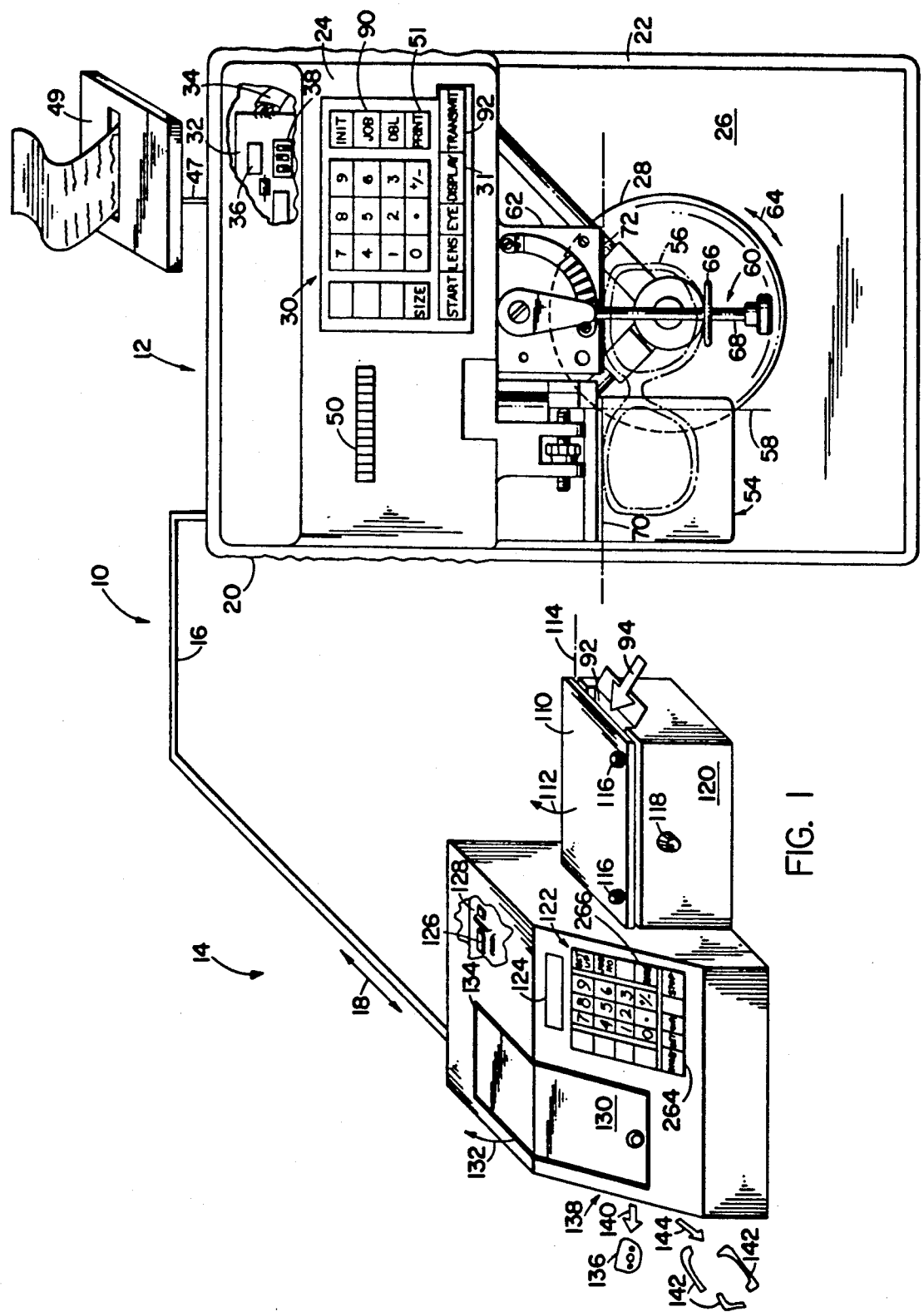
FIG. 1 is a schematic perspective view showing a system embodying the present invention for making a pattern for a lens opening in an eyeglass frame wherein the major system components are arranged at one location.

Turning now to the drawings and considering FIG. 1 specifically, a system embodying the present invention for making a unique pattern for a lens opening in a specific eyeglass frame is shown and designated generally 10. The system 10 comprises a frame tracing apparatus 12 and a pattern generating apparatus 14 coupled to the frame tracing apparatus by a multiple lead electrical conductor 16, which conductor carries electrical signals between the frame tracing apparatus and the pattern generating apparatus in a direction figuratively illustrated by the arrow 18. The tracing apparatus 12 includes a housing 20 comprising a base portion 22 and a cover 24. The housing 20 also includes a substantially flat surface 26 along which a stylus assembly 28 is moved in a plane substantially parallel to the plane of the surface 26. In the illustrated embodiment, the tracing apparatus 12 is shown as it is used to trace a lens opening in an eyeglass frame. However, it will be appreciated that an optical lens or a pattern may be traced to provide the characterizing data for use by the pattern generating apparatus 14.

The cover 24 includes a keypad 30 for entering data, instructions and other information in the form of digitally encoded electrical signals coupled to electronic components on an electronic circuit board 32 and which components comprise the control, computing, and other circuitry of the tracing apparatus. The circuit board 32 is coupled to the various subassemblies comprising the tracing apparatus and to the keyboard 30 via a multiple lead electrical conductor 34.

A controller or microprocessor 36 is located on the circuit board 32 and includes a memory for containing an instruction set comprising a control program. The program causes the controller in response to the various ones of the inputted and sensed electrical signals to direct in accordance with the instruction set the operation of the tracing apparatus 12.

An option selection switch 38 is located on the circuit board 32 and is electrically coupled to the controller 36. The switch 38 is an 8 bit DIP switch and is operated to a desired one of a number of positions. Each different position generates a different binary coded digital signal to select for displaying on an alphanumeric display device 50 or printing on a printer 49, a corresponding one of a number of predetermined combinations of output information associated with the characterization of the size and shape of a traced lens opening, a traced lens or a traced pattern. The characterization of the size and shape of a frame lens opening, lens or pattern is dimensionally represented using the boxing measurement system.

Figure 2:
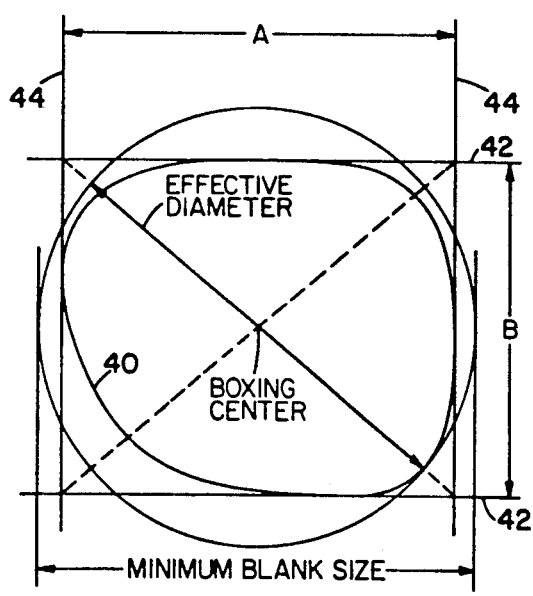
FIG. 2 is a diagram illustrating a representation of a number of dimensional parameters associated with the boxing measurement system.

Referring to FIG. 2, a diagram illustrating the representation of a number of dimensional parameters associated with the boxing measurement system is shown. The boxing center is defined as the center of the smallest rectangle which encloses a lens shape 40 using horizontal lines 42,42 and vertical lines 44,44. The pattern size or A dimension is defined as the distance between the two vertical sides 44,44 of the box. The B dimension is defined as the distance between the horizontal lines 42,42. The boxing center corresponds to the mechanical center of the box and accordingly the lens or pattern for those cases where decentration is not required. Once the box dimensions and the mechanical center are determined, the longest or effective diameter (ED) across the boxing center can be determined. The effective diameter (ED) is used in selecting a minimum lens blank size to ensure that a desired shape can be cut from it, that is, a lens will not be ground thicker than necessary nor too thin at its edges for a specific frame chosen.

Turning again to FIG. 1 and considering the options selectable through the operation of switch 38, each option causes radii lengths at a predetermined number of spaced apart locations along the traced path and other dimensional data, such as, the A and B dimensions and the ED to be displayed or printed. For example, one selected option causes the instruction set to display radii lengths at 90 degree intervals and another selected option causes the instruction set to display radii lengths at 45 degree intervals along the traced path. Combinations differing from the predetermined combinations may be implemented by modifying the instruction set. Only a predetermined number of radii lengths of the total number of radii lengths calculated by the instruction set are displayed in accordance with a given selected option. The instruction set in the preferred embodiment actually characterizes a given trace by calculating 400 radii lengths and their associated respective angles.

The alphanumeric display device 50 is mounted on the cover 24 and is coupled to and electrically driven by the electronic circuitry located on the circuit board 32. The display 50 functions as an operator prompt by displaying messages and instructions for carrying out the tracing procedure and also displays the status of the tracing apparatus during the tracing sequence. The display 50 additionally displays, as stated above, the value of dimensional data associated with the characterization of the size and shape of a traced lens opening, a traced lens or a traced pattern. The display mode is activated to sequentially display the dimensional data after a trace is completed by operating the DISPLAY function key 52 on the keypad 30.

The printer 49 is connected to the tracing apparatus 12 via a multiple lead conductor 47 and is electrically driven by electronic circuitry located on the circuit board 32. The printer 49 is activated by operating the PRINT function key 51 on the keypad 30.

An eyeglass support bridge designated 54 is used to support an eyeglass frame, shown in phantom in FIG. 1 and designated 56 so that the lens opening to be traced is held over the area through which the stylus assembly 28 travels. The bridge 54 is arranged for limited pivotal movement about an axis 58 to permit adjustment of the plane of a lens opening in a frame 56 supported on the bridge 54 to be substantially parallel to the surface 26.

An eyeglass frame holding mechanism 60 is mounted on a platform 62 located adjacent the bridge 54 and is arranged for movement in the direction of arrow 64. The eyeglass frame holding mechanism 60 includes a self-jamming frame engaging member 66 that slides coaxially along the surface of a rod 68 comprising the holding mechanism 60. The frame is placed on the bridge 54 and oriented above the surface 26 so that the frame is placed against a front edge surface 70 of the bridge 54 and 72 of the platform 62. The edge surfaces 70 and 72 are in substantial alignment so that when a frame is placed in contact with the edge surfaces the A axis of the eyeglass frame is properly oriented with the A axis of a lens or a pattern associated with the lens opening in the frame. After the frame is properly positioned, the member 66 is slid into contact with the eyeglass frame using thumb pressure and jams upon contact with the frame to hold it against the front edge surface 70 without distorting the frame.

Still referring to FIG. 1 and additionally to FIG. 3, the stylus assembly 28 is shown rotatably coupled about a longitudinal axis 74 to two encoder arms 76,78, respectively. The encoder arm 76 has a variable length and comprises an axially elongated rod having its free end 80 supported by a rotatable encoding mechanism 82. The arm 76 is arranged for reciprocating movement in a direction indicated by arrow 84 as the length of the arm changes when the stylus assembly 28 is moved along the travel surface 26. The encoder arm 78 is substantially identical to the encoder arm 76 and has a variable length and comprises an axially elongated rod having its free end 86 supported by a rotatable encoding mechanism 88.

The rotatable encoding mechanisms 82 and 88 are mounted in a spaced apart relationship to one another and at a predetermined distance and form one side of a triangle. The data representative of and corresponding to the distance C is used by the instruction set in the controller 36 in conjunction with data representative of and corresponding to the change in length of the encoder arms 76 and 78 as sensed by the encoding mechanisms 82 and 88. The lengths of the encoder arms 76 and 78 are represented by the distances A and B respectively and each forms one side of the triangle defined by sides A, B. and C.

The rotatable encoding mechanisms 82 and 88 are electrically coupled to electronic circuitry located on the circuit board 32 which circuitry senses the electrical signals produced by the encoding mechanisms as the lengths of the encoder arms 76,78 change as the stylus assembly 28 is moved along the travel path. Since the change in lengths of A and B with respect to an initial calibration position is known at each of the sensed positions along the travel path and the length C is predetermined and known, the coordinate associated with each sensed data point can be determined using well known trigonometric relationships. Reference may be had to U.S. Pat. No. 4,724,617 issued Feb. 16, 1988 to Logan et al. and entitled APPARATUS FOR TRACING THE LENS OPENING IN AN EYEGLASS FRAME Ser. No. 896,624 which issued as U.S. Pat. No. 4,724,617 on Feb. 16, 1988 and assigned to the same assignee as the present invention for further details of the tracing apparatus and the disclosure of which is incorporated herein by reference.

Still referring to FIG. 1, a JOB function key 90 located the keypad 30 is used to assign an identifying number to a set of dimensional data for a given trace for a specific eyeglass frame to permit subsequent access and retrieval from a memory in the tracing apparatus or in a data base computer as described below.

Figure 7:
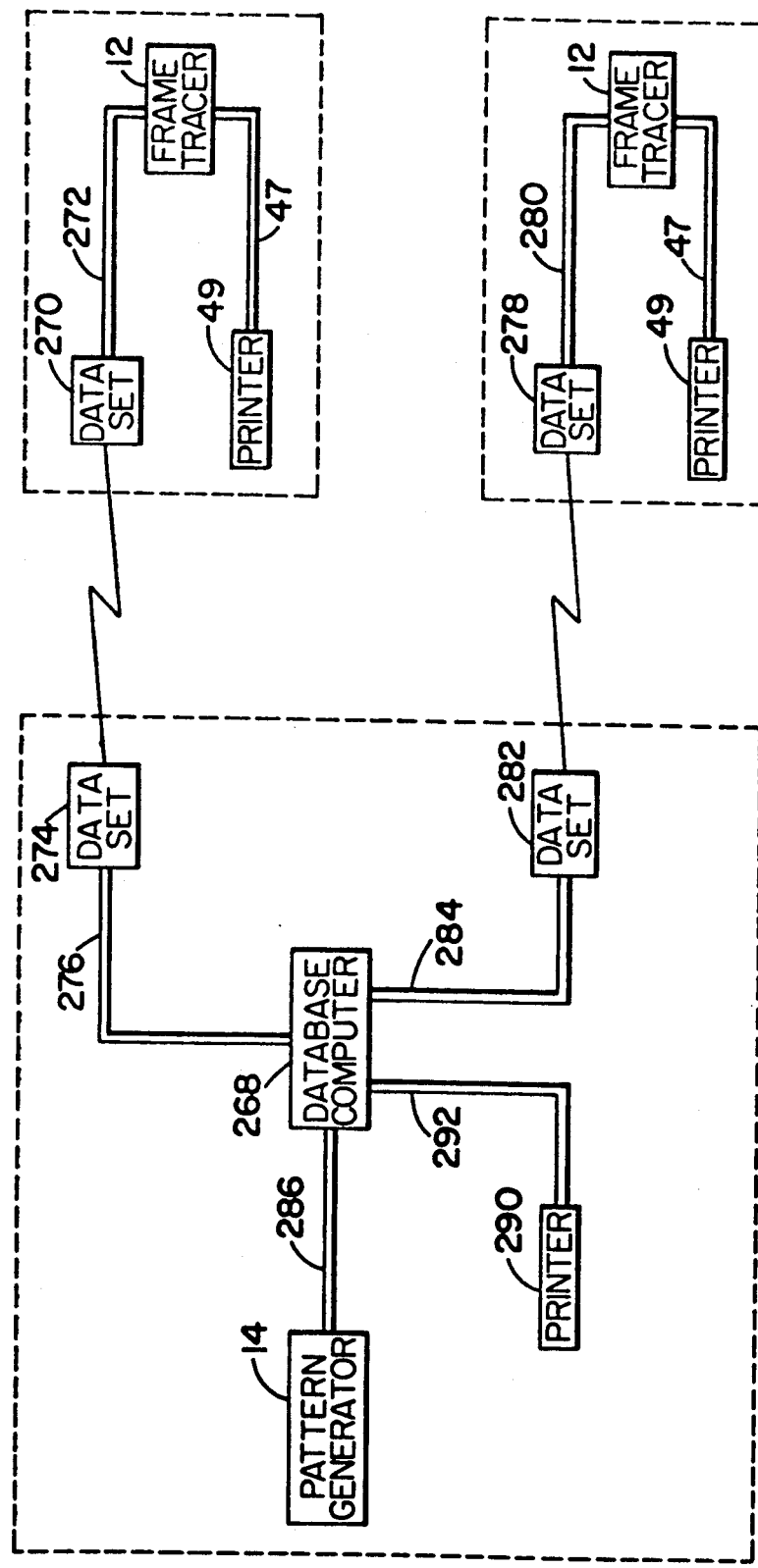
FIG. 7 is a schematic, functional block diagram representation of the system embodying the present invention wherein a number of frame tracing apparatus are coupled to a remotely located pattern generating apparatus through a central data base computer arranged for communication with the frame tracing apparatus by a data communications link.

The tracing apparatus 12 includes circuitry for converting the dimensional data of a trace into digitally encoded words for transmission to the pattern generating apparatus 14 or a data base computer as described in the discussion of FIG. 7 using well known data transmission techniques. In one embodiment, the tracing apparatus 12 includes circuitry located on the circuit board 32 to convert the digitally encoded words into a well known, RS-232 data format and for providing the necessary supervisory transmission and receiving command signals. The transmission of data is accomplished by the operation of a TRANSMIT key 92 which causes the associated circuitry to send the appropriate supervisory signals and the data to the pattern generating apparatus 14 on the conductor 16 coupled between the tracing apparatus and the pattern generating apparatus.

Figure 5:
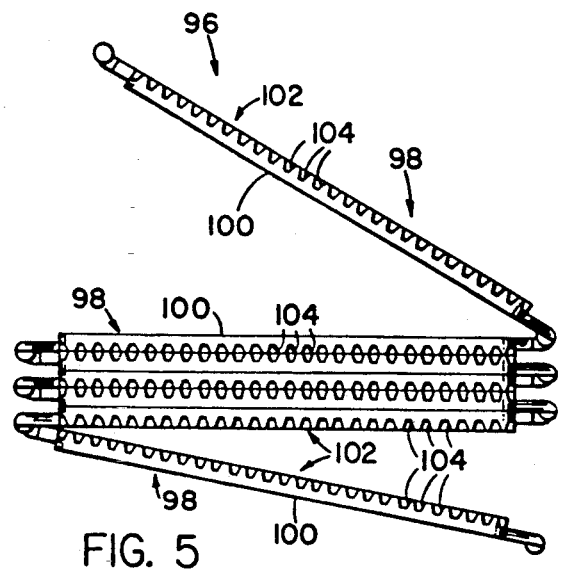
FIG. 5 is a side view of a number of blanks in a chain arranged to form a compactly folded package.
Figure 4:
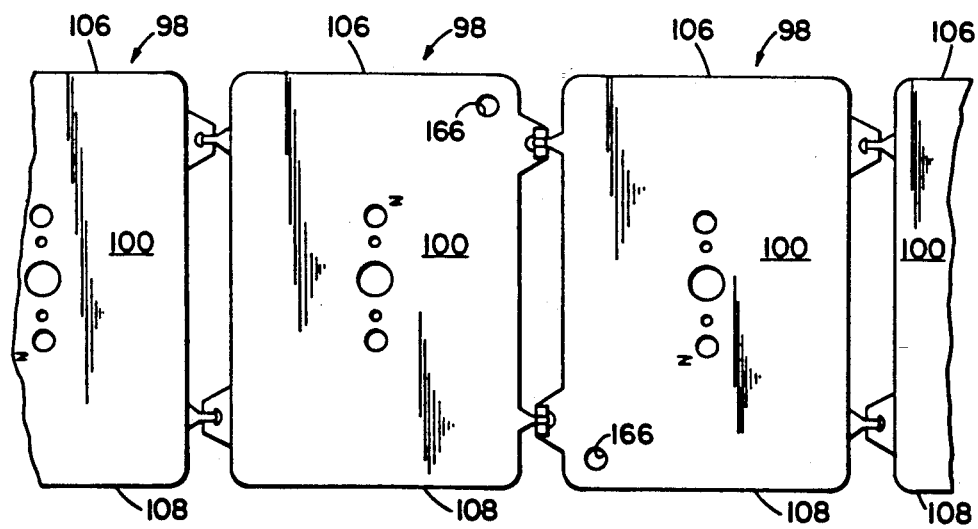
FIG. 4 is a top view of a number of blanks in a chain particularly suited for automatic feeding of the pattern generating apparatus.

The pattern generating apparatus 14 includes a blank feeding and staging area designated generally 92 through which a blank travels in a direction shown by arrow 94 along a path in the generator. The blanks may be fed singly on a one-at-a-time basis but preferably are fed as a chain 96 which chain is illustrated in FIGS. 4 and 5. FIG. 4 illustrates a number of blanks 98,98 extended in an end-to-end fashion as they might be fed along the feeding and staging area 12 of the pattern generator. FIG. 7 illustrates a number of blanks 98,98 in a like face-to-like face arrangement to form a compactly folded package. Each blank 98 comprises a rectangularly shaped, relatively thin body having an upper surface 100 and a lower surface 102 and arranged to be connected together in a hinged, like edge-to-like edge fashion. The lower surface 102 of each blank 98 includes teeth 104,104 comprising a rack gear along each margin 106,108 of the blank. A blank suitable for use with the pattern generator 14 is disclosed in U.S. Pat. No. 4,761,315 issued Aug. 2, 1988 and entitled BLANK FOR USE IN A LENS PATTERN GENERATOR Ser. No. 896,840 and assigned to the same assignee as the present application. Reference may be had to the disclosure of the blank for further details and which disclosure is incorporated herein by reference.

The pattern generator 14 includes a hinged lid 110 in the region of the blank feeding and staging area 92 and the lid opens in a direction indicated by arrow 112 pivoting about an axis 114 when fasteners 116,116 are operated to release the lid. A knob 118 extends from an outside front wall 120 of the blank feeding and staging area and is coupled to drive gears having teeth to engage the teeth 104,104 along the margins 106,108 of a blank. Turning the knob causes the drive gears to rotate to facilitate the loading of a blank 98 in a chain 96 of blanks into the generator.

The pattern generator 14 also includes a keypad 122 for selecting various functions of the pattern generator and for inputting information into the generator. A display 124 is used as an operator prompt by displaying messages and instructions and to display other information and data. A microprocessor or controller 126 is contained on a circuit board 128 along with other electrical components comprising the electronic circuitry necessary to control the operation of the pattern generator 14. The controller 126 has a memory for containing an instruction set and operates in accordance with the instruction set to direct the cutting and other operations performed by the pattern generator.

A hinged access panel 130 opens in the direction of arrow 132 about a hinged axis 134 to permit access to components in the region of the work station located in the area beneath the panel. A pattern 136 cut at the work station is discharged from one side 138 of the generator in the direction of arrow 140 and scrap parts 142,142 that occur as a result of cutting a pattern from a blank are discharged from the generator in the direction of arrow 144.

Considering now FIG. 6 a schematic front view of the pattern generating apparatus 14 used with the system embodying the present invention is shown with its cover removed. The generator 14 includes a drive mechanism designated generally 146 for moving blanks along a path 148 to a work station generally indicated 150. The drive mechanisms 146 comprises a set of drive gears 152,152 and 154,154 disposed opposite one another at either side of the path 148 and spaced apart from one another so that the teeth of the drive gears 152,154 present a constant pitch to the teeth along the lower surface of blanks 98,98 fed along the path 148. A step motor 156 includes a drive pulley 158 coupled to the drive gears 152,154 by a drive belt 160 to synchronously rotate the gears.

A sensor 162 is located along one margin of the path 148 and cooperates with an LED 164 mounted in the lid 110. The LED 164 is aligned opposite the sensor 162 when the lid is in its closed position so that a blank 98 moving along the path 148 passes through an energy beam established between the sensor 162 and the LED 164. The sensor 162 and LED 164 are located a predetermined distance from the work station 150 to permit accurate indexing of a blank along the path 148 by the gears 152,154 as the step motor 156 operates in accordance with control signals from the controller 126.

When the energy beam between the sensor 162 and the LED 164 is broken by the presence of an edge of a blank 98 advancing along the path 148, the beam interruption is detected by the controller 126 and a counter is set in the controller to cause the step motor 156 to rotate the drive gears 152,154 for a specific number of steps to advance the blank a predetermined distance along the path.

In addition to detecting the edge of a blank, the presence of the energy beam passing through an opening 166 in the body of the blank is detected by the controller 126 to determine the nasal side orientation of a blank at the work station 150. The determination of the nasal side orientation of a blank at the work station is necessary to transform the data characterizing the size and shape of a pattern to be cut from the blank so that the data corresponding to the nasal side is correlated with the nasal side of a pattern cut from the blank. As shown in FIG. 4, each blank 98 contains an opening 166 located along one side of the blank and the location of the opening corresponds to the nasal side of the blank as indicated by the letter N. The letter N is embossed on the blank and allows identification of the nasal side of a pattern.

Since the number of blanks between the work station 150 and the sensor 162 is known, the controller 126 responds to the presence of the energy beam passing through the opening 166 in the body of blank at a predetermined time after the edge of the blank is detected to determine the orientation of a blank at the work station. Since the blanks are fed in an alternating nasal side arrangement, the instruction set in the controller 126 anticipates the detection of the presence of the energy beam for every other blank passing the sensor. If the sequence is not followed, the instruction set causes a message to be displayed to alert an operator of the improper sequence.

The work station 150 includes a fixturing mechanism 167 and a blank separating mechanism generally indicated 168 for separating a blank 98 from an immediately adjacent connected blank by forcing the blanks apart at the hinged connection point between the blanks. The blank separating mechanism 168 comprises a separating plate 170 pivotally connected at one end 172 to a hinge 174 having one hinge portion 176 mounted to the surface 178 of the frame 180 at the side of the work station 150 nearest the discharge side 138 of the pattern generator. The opposite end 182 of the plate 170 is connected to a pull down bar 184 which in turn is connected to a step motor 186 by a screw shaft 188 attached to the pull down bar 184 and through a nut 190 held and rotated internally in the step motor 186. The nut 190 is rotated by the step motor 186 to move the plate toward and away from the step motor 186 in a direction indicated by arrow 192. The plate 170 further includes a counter sink 194 attached to the lower surface 196 of the plate such that the counter sink is in alignment with a center mounting pin 198 associated with the fixturing mechanism 167. When the step motor 186 is activated in a direction to separate adjacent blanks, the counter sink 194 engages with a center chucking hole in a blank at the work station 150 and pushes the blank on to the center mounting pin 198, thus forcing the pin 198 into a cavity 200 of a spindle body 202 comprising the fixturing mechanism 167. Other chucking holes in the blank are aligned with locating pins 204,204 and engage the pins as the blank is separated from the chain of blanks. Additionally, the blank is pushed from an input feed level to a lower working level so that a blank fixtured on the spindle body 202 can be rotated without interfering with other blanks in the chain at the input feed level.

After a pattern is cut from a blank at the work station 150, the step motor 186 is activated to raise the plate 170 to release a pattern cut from a blank and held on the spindle body 202. The center mounting pin 198 is pushed upward out of the cavity 200 by a spring 206, which forces the pattern to disengage from the locating pins 204,204. The next blank advancing to the work station 150 contacts a pattern resting on the spindle body 202 and pushes the pattern to discharge it from the generator.

The step motor 186 is mounted to a motor holder 208 which is pivotally connected at one end 210 to the surface 212 of the frame 180 to permit the step motor to rotate and maintain an alignment with the screw shaft 188 and the pull down bar 184 as the distance between the step motor and the one end 182 of the separating plate 170 increases and decreases as the end 182 is moved in a direction indicated by arrow 192.

The fixturing mechanism 167 comprising the spindle body 202 is mounted for rotation at the work station 150 in bearings 214 and 216 and includes a drive pulley 222 axially connected to the spindle body. A step motor 218 includes a drive pulley 220 coupled to the drive pulley 222 by a drive belt 224 to rotate the spindle body 202 about its longitudinal axis 226. The step motor 218 is coupled to the controller 126 and is activated and deactivated in accordance with signals from the controller to rotate the spindle body 202 and accordingly a blank fixtured to the spindle body. The step motor 218 rotates the spindle body 202 about its longitudinal axis 226 with a resolution of 8,000 steps per 360 degrees, that is, one revolution of the spindle.

A cutting mechanism generally designated 228 moves relative to the rotation of a blank fixtured at the work station 150 and in a direction substantially perpendicular to the path 148. The cutting mechanism 228 includes a router 230 mounted to a carriage 232 for movement with the carriage toward and away from the work station. The carriage 232 moves on guide bars 234 and 236 disposed opposite and substantially parallel to one another. The guide bars 234 and 236 are mounted to the frame 180 by mounting collars 238 and 240 respectively at one end of the guide bars and by other collars not shown at the opposite end of each of the guide bars. The carriage 232 is propelled along a rectilinear path toward and away from the work station 150 by a step motor 242 having a screw shaft 244 coupled to a ball nut assembly 246 mounted to the carriage 232.

The router 230 comprises a router body 248, a router spindle 250 extending lengthwise through the body 248 such that an axis 252 extending lengthwise through the center of the router spindle is substantially perpendicular to the plane of the path 148 in which the blanks travel. The router spindle 250 is arranged with a bit chuck 254 at one end nearest the work station 150 and a driving pulley 256 at its opposite end. A motor 258 has a motor shaft 260 and a pulley attached thereto for rotation with the shaft and is coupled to the drive pulley 256 by a drive belt 262 to provide rotational driving power to the router to rotate a router bit held by the bit chuck 254.

The pattern generator 14 cuts a unique pattern in accordance with the data characterizing the size and shape of a lens opening in a specific eyeglass frame and which data is provided from the frame tracing apparatus 12 as explained above. The instruction set in the controller 126 transforms the 400 points characterizing the size and shape of a lens opening into 8,000 points along the periphery defining the edge of the pattern. A linear interpolation algorithm in the instruction set is used to smooth the resolution differences between the 400 points provided by the frame tracing apparatus and the 8,000 points generated by the pattern generator. The cutting algorithm contained in the instruction set is similar to that used in a computer controlled milling machine to produce parts having smoothly cut edges.

A pattern is cut from a blank at the work station after a START key 264 is operated which causes the pattern generator to wait for data from the frame tracing apparatus 12 when the pattern generator is operating in a local mode as selected by a MODE function key 266.

Reference may be made to U.S. Pat. No. 4,711,035 issued Dec. 8, 1987 to Logan et al. and entitled METHOD AND APPARATUS FOR MAKING A PATTERN FOR A LENS OPENING IN AN EYEGLASS FRAME Ser. No. 896,615 which issued as U.S. Pat. No. 4,711,035 on Dec. 8, 1987 and assigned to the same assignee as the present application for further details of the pattern generating apparatus 14 and which disclosure is incorporated herein by reference.

Turning now to FIG. 7, a schematic functional block diagram representation of the system embodying the present invention is shown wherein a number of frame tracing apparatus 12,12 are coupled to a remotely located pattern generating apparatus through a central data base computer 268 arranged for communication with the frame tracing apparatus by a data communications link. In some instances, a practitioner may have several locations at which eyeglass frames are selected and fitted to an eyeglass purchaser for example, locations represented by a chain of optical centers wherein each of the locations sends its respective orders to a central laboratory for processing after which the completed job is returned to the location which originated the order. The speed of such an operation is greatly increased using the system of the present invention wherein a lens opening in a desired specific eyeglass frame is traced at the location where the frame is fitted to an eyeglass purchaser. The data characterizing the size and shape of the lens opening and an associated job number is transmitted to the data base computer 268 at the central laboratory by a conventional data set using standard telephone lines. Once the trace is completed by the frame tracer, the TRANSMIT function key 92 is operated to cause the frame tracer to activate the data set 270 coupled to an output data port of the frame tracer by a data cable 272. The operation of the TRANSMIT key 92 signals the data set that the characterizing data and its associated job identification number which are in the form of digitally encoded words is ready for transmission by the data set 270. The data set 270 may be of the automatic dial type which dials a telephone number associated with a compatible data set, for example, data set 274 located at the central laboratory. The operation of a data set is well known to those skilled in the art, and it is sufficient for purposes of this disclosure that the data set be operable at any desired transmission rate as limited by the communication facility over which the data set operates.

The data base computer 268 at the central laboratory is coupled to the data set 274 by a data cable 276 to receive the digitally encoded words representative of the characterizing data and the associated job identifying number. The received digital information is stored in a memory in the data base computer 268 along with other information received from frame tracers at other locations. One such other location, for example, is illustrated by the data set 278 coupled to frame tracer 12 by data cable 280. The data set 278 transmits the digitally encoded words representative of the characterizing data and an associated identifying job number via a communication link to the data set 282 located at the central laboratory. The data set 282 is connected to the data base computer 268 via a data cable 284 to transmit the digitally encoded words to the memory of the computer 268.

A printer 290 is coupled to the data base computer 268 by a cable 292 and provides a means for listing or displaying all the job identifying numbers having associated characterizing data stored in memory, if any such jobs are present. An operator can access any jobs in the data base computer memory by entering the desired job number into the pattern generator 14 via the keyboard 122 when the generator is in the remote operating mode.

In order to use the pattern generator 14 in the remote operating mode, the MODE function key 266 on the keyboard 122 is operated. In the remote operating mode, the controller 126 in the pattern generator 14 requests information from the memory of the data base computer 268 via electrical signals transmitted between the data base computer and the pattern generator by a data cable 286 coupling an output port of the computer to an input data port associated with the pattern generator. After the requested information has been transferred into the pattern generator 14 from the data base computer 268, the START function key 264 on the pattern generator keyboard 122 is operated to cause the pattern generator to cut a pattern in accordance with the characterizing data requested via the job identifying number and received from a remote location via the central data base computer.

Because the operation of the pattern generating apparatus 14 is substantially automatic, the pattern generating apparatus can accommodate data transmitted to the data base computer from a number of remote locations. In some instances, there may be more remote frame tracer locations than are capable of being accommodated by a single pattern generator. Consequently, two or more pattern generators may be coupled to the data base computer, each pattern generator being able, by entering a job identifying number, to access the memory of the data base computer containing data associated with the job and characterizing the shape of a lens opening that was entered from a frame tracing apparatus at a remote location.

A system and related method for producing unique a pattern for a lens to be formed and then placed in an opening in a specific eyeglass frame wherein data characterizing the size and shape of the associated lens opening is provided to a pattern generator by a frame tracing apparatus coupled to the pattern generator has been described in several preferred embodiments. It will be noted that numerous changes and modifications may be had without departing from the spirit and the scope of the invention, and therefore, the invention has been described by way of illustration rather than limitation.

We claim:

1. An eyeglass frame lens opening pattern generating system for producing a unique pattern associated with one specific eyeglass frame and from which unique pattern an optical lens is to be formed and subsequently placed in the corresponding lens opening in the associated one specific eyeglass frame from which the unique pattern is produced, the associated one specific eyeglass frame being the actual eyeglass frame from which the unique pattern is produced, said system comprising:

first apparatus means including means for sensing a predetermined number of data points at spaced apart locations along the inner periphery of a lens opening in one specific eyeglass frame and coordinate data generating means for generating from said sensed data points a temporary set of coordinate data collectively defining and uniquely characterizing the size and shape of said lens opening in the one specific eyeglass frame for which said temporary set of coordinate data is generated;

at least one blank from which a pattern is to be cut;

second apparatus means remote from said first apparatus means and including cutting means for cutting said blank and further comprising:

a work station;

means for feeding said blank to said work station;

a cutter associated with said cutting means, said cutter being adapted for rectilinear movement along a path toward and away from said work station, and means for fixturing said blank at said work station for rotational movement about an axis extending axially through said fixturing means and generally perpendicularly to said cutter path to provide rotational movement of a fixtured blank relative to the movement of said cutter;

means for transmitting said temporary set of coordinate data from said coordinate data generating means to said cutting means;

means associated with said cutting means for receiving said temporary set of coordinate data from said coordinate data generating means, means for controlling said cutting means to cut said blank in accordance with said temporary set of coordinate data to produce the unique pattern having the size and shape of the lens opening in said actual eyeglass frame for which said temporary set of coordinate data is generated, and including means for containing a second instruction set to control the operation of said cutting means; and said blank further including a nasal side and a non-nasal side and said blank feeding means including sensing means for determining the nasal side orientation of said blank when a said blank is located at said work station.

2. A lens opening pattern generating system for producing a pattern as defined in claim 1 wherein said first apparatus means includes:

means for supporting an eyeglass frame lens opening in a plane substantially parallel with a reference plane, said reference plane including a number of data points comprising a data space;

a tracing stylus moveable in the vicinity of the frame supporting means and parallel to the reference plane for following the inner periphery of a lens opening in an eyeglass frame located on said support means, said stylus being arranged for complementary engagement with the eyewire groove along the inner periphery of the lens opening of an eyeglass frame;

sensing means coupled to said tracing stylus for sensing said tracing stylus at a number of data points in said data space along the travel path of said tracing stylus, and computing means responsive to said sensing means for calculating the set of coordinates associated with said number of sensed data points along the travel path for those adjacent data points that are a predetermined spaced apart distance from an immediately prior sensed data point.

3. A lens opening pattern generating system for producing a pattern as defined in claim 1 wherein said computing means further includes a first instruction set for controlling the operation of said data coordinate generating means.

4. A lens opening pattern generating system for producing pattern as defined in claim 3 wherein said first instruction set further includes means for producing information representative of the size and shape of a lens opening as defined by a box dimensioning system of measurement wherein said dimensions include an A and B axis length, an effective diameter length and its associated angle with respect to a reference axis, and a length of each of a number of radii and its respective associated angle with respect to said reference axis for a predetermined number of said number of sensed data points along the stylus travel path;

means for assigning a unique job number to identify said temporary set of coordinate data, and means for printing said information representative of said dimensional data.

5. A lens opening pattern generating system for producing a pattern as defined in claim 4 wherein said data coordinate generating means includes display means for displaying operator messages and prompting instructions and for displaying the value of said dimensional data.

6. A lens opening pattern generating system for producing a pattern as defined in claim 5 wherein said data coordinate generating means includes means for encoding said dimensional data into digitally formatted binary coded words, and data transmission means for transmitting said digitally encoded words to said second apparatus means including said cutting means.

7. A lens opening pattern generating system for producing a pattern as defined in claim 1 wherein said blank further comprises:

a relatively thin rectangularly shaped body with generally parallel top and bottom major faces, first and second side edges parallel to and opposite one another and first and second end edges parallel to and opposite one another and perpendicular to said side edges, a series of teeth located along said first and second side edges for engaging with said feeding means for moving the blank in a direction parallel to its side edges, nasal locating means defining an opening extending through said body between said top and bottom faces and substantially in the vicinity of one corner of said body at a predetermined distance from said first and second end edges and from first and second side edges to permit a beam of energy produced by a light emitting source in said sensing means to pass through said opening for detection by a light sensor in said sensing means when said opening and said energy beam are in registry, first hinge means located adjacent said first end edge, and second hinge means located adjacent said second end edge, said hinge means located adjacent one of said first and second end edges being adapted for snap engagement with said hinge means located adjacent one of said first and second end edges of a similar blank, said hinge means located adjacent said first end edge of one blank cooperating with said hinge means located adjacent said first end edge of a similar advance blank located adjacent said first end edge to permit said blank and said similar advance blank to rotate relative to one another about a pivot axis of said hinge means associated with said first end edge and said second hinge means located adjacent said second end edge of said one blank cooperating with said hinge means located adjacent said second end edge of a similar rear blank located adjacent said second end edge to permit said blank and said similar rear blank to rotate relative to one another about a pivot axis of said hinge means associated with said second end edge, said pivot axis of said hinge means associated with said first end edge being coplanar with one of said top and bottom faces and said pivot axis of said hinge means associated with said second end edge being coplanar with the other of said top and bottom faces.

8. A lens opening pattern generating system for producing a pattern as defined in claim 7 wherein said blank includes means for chucking the blank and a pattern cut from the blank.

9. A lens opening pattern generating system for producing a pattern as defined in claim 6 further including a central data base computer for receiving said dimensional data from a number of said first apparatus means including said data coordinate generating means, said data base computer having means for containing a third instruction set, said third instruction set having means for identifying each of said data coordinate generating means and correlating data to a given job number associated with said dimensional data received from said identified data coordinate generating means for subsequent retrieval and transmission to said controlling means associated with said cutting means.

10. An eyeglass frame lens opening pattern generating system for producing a unique pattern associated with one specific eyeglass frame and from which unique pattern an optical lens is to be formed and subsequently placed in the corresponding lens opening in the associated one specific eyeglass frame from which the unique pattern is produced, the associated one specific eyeglass frame being the actual eyeglass frame from which the unique pattern is produced, said system comprising:

first apparatus means including means for sensing a predetermined number of data points at spaced apart locations along the inner periphery of a lens opening in one specific eyeglass frame and coordinate data generating means for generating from said sensed data points a temporary set of coordinate data collectively defining and uniquely characterizing the size and shape of said lens opening in the one specific eyeglass frame for which said temporary set of coordinate data is generated;

at least one blank from which a pattern is to be cut;

second apparatus means remote from said first apparatus means and including cutting means for cutting said blank;

means for transmitting said temporary set of coordinate data from said coordinate data generating means to said cutting means;

means associated with said cutting means for receiving said temporary set of coordinate data from said coordinate data generating means, and means for controlling said cutting means to cut said blank in accordance with said temporary set of coordinate data to produce the unique pattern having the size and shape of the lens opening in said actual eyeglass frame for which said temporary set of coordinate data is generated.

11. A process of producing for a lens opening in one specific eyeglass frame, a unique pattern from which an optical lens is to be formed and subsequently placed in the corresponding lens opening in the associated one specific eyeglass frame from which the unique pattern is produced, the associated one specific eyeglass frame being the actual eyeglass frame from which the unique pattern is produced, the pattern being cut from a blank in a computer-controlled apparatus including a driven cutter, said process comprising the steps of:

tracing the periphery of a lens opening in the eyeglass frame and recording a series of data points along the tracing path;

calculating from said data points a temporary set of coordinate data collectively defining and characterizing the size, shape and selected dimensional measurements of the lens opening;

transmitting at least a portion of the temporary coordinate data set to the cutting apparatus;

rotating the blank relative to the driven cutter;

controlling the relative movement between the rotating blank and the driving cutter in accordance with said temporary coordinate data set to cut a pattern from the blank;

providing a first blank in a chain of blanks to the cutting apparatus in the region of the driven cutter;

separating said first blank from the chain of blanks and fixturing said first blank for rotation in the region of the driven cutter;

cutting said first blank to form a pattern, and advancing the next blank in said chain of blanks to eject the patter cut from said first blank.

12. A process for producing for a lens opening in one and only one eyeglass frame a unique pattern as defined in claim 11 further including the step of transmitting the portion of said temporary coordinate data set representative of said selected dimensional measurements to a printer.

* * * * *